(12) United States Patent
Reydellet et al.

(10) Patent No.: US 9,734,279 B2
(45) Date of Patent: Aug. 15, 2017

(54) METHOD OF DESIGNING A SYSTEM OF ELECTRICAL WIRINGS FOR A COMPLEX SYSTEM, AND CORRESPONDING COMPLEX SYSTEM

(71) Applicant: DASSAULT AVIATION, Paris (FR)

(72) Inventors: Guillaume Reydellet, Paris (FR); Philippe Mareschal, Vaucresson (FR); Romain Bernard, Paris (FR)

(73) Assignee: DASSAULT AVIATION, Paris (FR)

( * ) Notice: Subject to any disclaimer, the term of this patent is extended or adjusted under 35 U.S.C. 154(b) by 400 days.

(21) Appl. No.: 14/471,764

(22) Filed: Aug. 28, 2014

(65) Prior Publication Data
US 2015/0061379 A1    Mar. 5, 2015

(30) Foreign Application Priority Data
Aug. 29, 2013    (FR) ...................................... 13 02007

(51) Int. Cl.
*G06F 17/50*    (2006.01)
*B60R 16/023*    (2006.01)
*B60R 16/03*    (2006.01)

(52) U.S. Cl.
CPC ........ *G06F 17/5095* (2013.01); *B60R 16/023* (2013.01); *B60R 16/03* (2013.01); *G06F 2217/36* (2013.01)

(58) Field of Classification Search
CPC ............. G06F 17/5095; G06F 2217/36; B60R 16/023; B60R 16/03
See application file for complete search history.

(56) References Cited

U.S. PATENT DOCUMENTS

| | | | | |
|---|---|---|---|---|
| 2007/0050178 A1* | 3/2007 | Linzey | ................... | G06Q 50/30 703/2 |
| 2007/0141899 A1* | 6/2007 | Saini | .................... | G06F 17/509 439/502 |
| 2008/0111420 A1* | 5/2008 | Anghel | ..................... | H02J 4/00 307/9.1 |
| 2008/0266077 A1* | 10/2008 | Cagno | ..................... | H04B 1/74 340/538.11 |
| 2012/0271596 A1 | 10/2012 | Hadley et al. | | |
| 2015/0019187 A1* | 1/2015 | Jones | ................. | G06F 17/5009 703/8 |

* cited by examiner

*Primary Examiner* — Jared Fureman
*Assistant Examiner* — James Evans
(74) *Attorney, Agent, or Firm* — Davidson, Davidson & Kappel, LLC

(57) ABSTRACT

A method for designing a system of electrical wirings for a complex system, in particular applicable to the design of electrical wirings of an aircraft, is provided. The electrical wirings allow the flow of digital, analog or discrete data between the components of the complex system and/or the transmission of electricity to components of the complex system, the components of the complex system being grouped together in subsystems, each able to perform a predetermined function, and able to be broken down into subsystems each capable of performing a predetermined sub-function. The wirings are distributed into functional groups such that all of the wirings allowing the flow of one or more data and/or the transmission of electricity, directly or indirectly necessary for the operation of the components of a subsystem, for performing the corresponding function or sub-function are distributed in a single and same functional group.

25 Claims, 2 Drawing Sheets

METHOD OF DESIGNING A SYSTEM OF ELECTRICAL WIRINGS FOR A COMPLEX SYSTEM, AND CORRESPONDING COMPLEX SYSTEM

This claims the benefit of French Patent Application FR 13 02007, filed Aug. 29, 2013 and hereby incorporated by reference herein.

The present invention relates to a method for designing a system of electrical wirings for a complex system. It is in particular applicable to the design of electrical wirings for an aircraft or part of an aircraft.

A complex system is a system comprising at least two components, optionally grouped into two subsystems, each component or subsystem being able to perform a given function.

The electrical wirings are made up of one or more elementary conductive wires called electric cables.

A complex system such as an aircraft may include thousands of cables distributed in hundreds of wirings.

The electric cables are designed to allow the flow of digital, analog or discrete data between the components of the complex system, and/or to ensure the transmission of electricity, i.e., the electrical power supply, necessary for the operation of those components.

In the case of an electric cable providing the transmission of electricity, the electric power value transmitted to one or more components of that cable is likened, in the present description, to a datum flowing on that cable that is necessary for the operation of the component(s).

A wiring is said to provide for the flow of digital, analog or discrete data between components of the complex system, and/or the transmission of electricity necessary for the operation of those components, when it comprises at least one electric cable ensuring the flow of digital, analog or discrete data between those components of the complex system, and/or the transmission of electricity necessary for the operation of those components.

BACKGROUND

In a large number of industries, the electric systems that are designed must meet certification standards and regulations, established in order to ensure the reliability and safety of the complex systems incorporating them.

This is in particular the case in the aeronautics field, in which the methods for designing complex systems must make it possible to produce documents aiming to demonstrate to the certifying authorities that these complex systems indeed meet the regulations, and therefore make it possible to obtain certification.

In particular, all of the electric wirings of a system such as an aircraft are considered to be a completely separate system of the aircraft. The electric wiring system includes all of the equipment participating in the wiring: the cables themselves, as far as their ends, the connectors, the cutoff connectors, etc.

The regulations set out the following requirements for the wirings of an aircraft, as they also set them out for the other systems of the aircraft:

any catastrophic breakdown (i.e., causing a loss of the aircraft) cannot be due to a single breakdown; it must be extremely unlikely (breakdown likelihood below $10^{-9}$ per hour of flight), and any dangerous breakdown is unlikely (breakdown likelihood below $10^{-7}$ per hour of flight).

To meet this regulation, a safety analysis is necessary. It is produced in certification documents that must be approved by the certifying authorities. It must demonstrate that the safety requirements defined in the regulation have been met.

The known methods for designing the electrical wiring system of the aircraft generally consist of conducting an analysis of the consequence of wiring breakdowns, wiring by wiring, without any global approach at the system level. Using such an approach, it is very complicated to carry out a systematic formalization allowing a demonstration to the certifying authorities, with a safety analysis developed in certification documents to be produced.

SUMMARY OF THE INVENTION

More generally, the case-by-case study of wiring breakdowns, on all of the wirings of an aircraft, is a very expensive approach in terms of analysis time and analysis complexity. In fact, it is necessary to be able to obtain, for each studied wiring, all of the data flowing in that wiring, i.e., the data flowing in the cable(s) making up that wiring (digital data on the bus, discrete data and analog data, electrical power value transmitted for the electric power supply). Next, it is necessary to deduce the consequences for the aircraft locally speaking, from all the failures that may occur on that wiring.

To that end, it is necessary to consider the modification of each datum flowing in that wiring in case of failure (for example, untimely grounding of each cable, untimely powering on of each cable, cut wire, etc.), as well as the combination of modified data.

Furthermore, knowing that a large number of aircraft systems use and transmit data that flow within a same wiring, the consequences on each system must be correctly explained and added to obtain the final effect at the global aircraft level.

An object of the invention is therefore to resolve the aforementioned problems. Thus, the invention in particular aims to allow the design of a system of electrical wirings for a complex system, the wirings themselves being considered systems or subsystems, through a global approach at the complex system level, in particular in terms of failure analysis.

A method for designing a system of electrical wirings for a complex system, in particular an aircraft or a part of an aircraft, is provided. Each electrical wiring includes one or more electric cables designed to allow the flow of digital, analog or discrete data between components of the complex system and/or the transmission of electricity to components of the complex system, the components of the complex system being grouped together in subsystems each able to perform a predetermined function, each subsystem in turn being able to be broken down, to a predetermined level, into subsystems each capable of performing a predetermined sub-function.

The method includes a step for distributing the wirings into functional groups, such that all of the wirings allowing the flow of one or more data and/or the transmission of electricity, directly or indirectly necessary for the operation of the components of a subsystem, for performing the function or sub-function corresponding to that subsystem, are distributed in a single and same functional group.

According to certain embodiments, the device further comprises one or more of the following features, considered alone or according to all technically possible combinations:

the complex system comprises at least n redundant subsystems, with n greater than or equal to 2, each able to perform the same predetermined function or sub-function, the wirings allowing the flow of one or more data, and/or the transmission of electricity, directly or indirectly necessary for the operation of the components of one of the n redundant subsystems, in order to perform the corresponding function or sub-function, are distributed in a single and same functional group different from the functional groups in which the wirings are distributed allowing the flow of one or more data, and/or the transmission of electricity, directly or indirectly necessary for the operation of the components of the other n−1 redundant subsystems, each functional group is associated with a distinct wiring path within the complex system such that the wirings of a predetermined functional group pass through a wiring path distinct from the wiring paths of the other functional groups, the method comprises a step for determining the compatibility between two functional groups that in particular consists of determining whether any simultaneous failure on at least one wiring of one of the two functional groups and on at least one wiring of the other of the two functional groups leads to an unwanted event in the system, each functional group is associated with a wiring path in the complex system, two compatible functional groups are associated with a same wiring path, and two incompatible functional groups are associated with two distinct wiring paths, such that the wirings of two compatible functional groups pass through a same wiring path and the wirings of two incompatible functional groups pass through two distinct wiring paths, all of the wirings have an associated attribute, such as the color, and the value of the attribute of the wirings of a same functional group is distinct from the respective values of the attribute of the wirings of the other functional groups, the method comprises a step for verifying that a failure caused by a breakdown of each of the wirings within the functional groups does not lead to an unwanted event in the system, the verification step in particular consists of verifying that a simultaneous failure on at least two wirings of a same functional group does not lead to an unwanted event in the system, the verification step uses a failure tree representative of the sequence of events leading to an unwanted event in the system from one or more base events, at least one of the functional groups is associated with a nonelectric functional group grouping together connecting elements between components of the complex system, the nature of said connection not being electric, in particular hydraulic or pneumatic, the functional group associated with the nonelectric functional group, and that nonelectric functional group, are associated with a same physical path within the complex system, all of the wirings of the functional group associated with the nonelectric functional group are associated with an attribute, such as the color, all of the connecting elements of the nonelectric functional group are associated with the same attribute, and the value of the attribute of the wirings of the functional group associated with the nonelectric functional group is identical to the value of the attribute of the connecting elements of the nonelectric functional group, the method comprises a step for verifying that a failure caused by a breakdown of each of the connecting elements of an electric functional group does not lead to an unwanted event in the system.

According to another aspect, the invention also relates to a complex system comprising an electrical wiring system, such as an aircraft or part of an aircraft, each electrical wiring comprising one or more electric cables designed to allow the flow of digital, analog or discrete data between components of the complex system and/or the transmission of electrical power to components of the complex system, the components of the complex system being grouped together in subsystems each able to perform a predetermined function, each subsystem in turn being able to be broken down, to a predetermined level, into subsystems each able to perform a predetermined sub-function, the electrical wiring system being made according to the method as described above.

The method according to embodiments of the invention therefore proposes a global method for distributing the wirings in functional groups created to that end. The safety analysis of systems or sub-systems of electrical wirings necessary to verify the compliance with the certification requirements is thus done in the functional groups no more than at the level of each wiring, which makes it possible to simplify that analysis.

The approach for distributing the wirings into functional groups as early as possible in the design of the architecture of the wirings, optionally consolidated by the use of an analysis model of the aircraft, makes it possible to reduce the risks related to late modifications of the wirings.

The demonstration to the certification authorities may be based on the same type of safety analysis as the analyses typically done for each system or sub-system for its own certification, for example by using breakdown trees or failure trees.

Synthesis work is then necessary to consolidate the impacts of the wiring breakdowns at the global level of the aircraft system. The technical data useful for that analysis are automatically generated from breakdown trees.

If compatibility can be demonstrated between two functional groups, which should normally be segregated, it is then possible to justify a systematic segregation exception for all of the functional groups of the aircraft (crossed wirings, narrow zones, etc.).

Two groups that should normally be segregated are considered to be compatible if no simultaneous failure on those two groups leads to a catastrophic breakdown.

The assignment of a color for a functional group, therefore for all of the wirings making it up, simplifies the visual analysis of the wirings in the cargo holds of the aircraft.

The assignment of a functional group to each wiring of the system also makes it possible to facilitate multi-system comprehension, as well as the integration of the systems with one another at their interfaces.

BRIEF SUMMARY OF THE DRAWINGS

The features and advantages of the invention will appear upon reading the following description, provided solely as an example and non-limitingly, in reference to the appended figures.

DETAILED DESCRIPTION

As an example, in the rest of the description, attention will be more particularly be paid to the electrical wirings of an aircraft.

The design approach the architecture of the wiring system is based on the design process for aircraft systems. In order to meet the safety requirements and perform the analysis at the global aircraft level, the wirings are segregated or distributed by functional groups, of which there are two, FG1 and FG2, in the example of FIG. 1, and four, FG1 to FG4, in the example of FIGS. 2 and 3.

A functional group FG1 to FG4 represents a set of physical wirings in the aircraft.

These wirings comprise one or more electric cables designed to allow the flow of digital, analog or discrete data between components or pieces of equipment of the system and/or to ensure the transmission of electrical power, i.e., electricity, necessary for the operation of the equipment.

An electric cable ensuring the transmission of electrical power to one or more components is considered to allow the flow of a datum necessary for the operation of the component(s) in question, such as the electrical power value transmitted by that cable.

A wiring is said to ensure the flow of digital, analog or discrete data between components of the complex system and/or the transmission of electrical power necessary for the operation of those components when it comprises at least one electric cable ensuring the flow of digital, analog or discrete data between those components of the complex system, and/or the transmission of electrical power (therefore electricity) necessary for the operation of those components.

Figure 1:
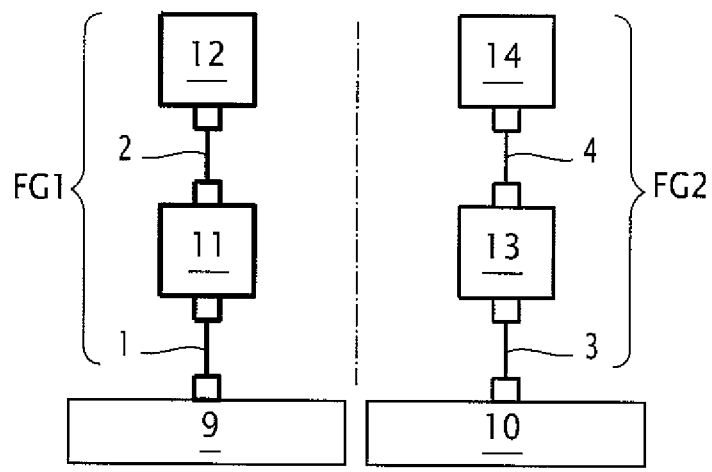
FIG. 1 is a diagrammatic illustration of an electrical wiring system done according to the inventive method for a system with an order 2 segregation or distribution.

In the example of FIG. 1, in functional group FG1, the wiring 1 provides the electricity for the equipment 11 owing to the equipment 9, which in this example is a first electricity source (also called junction box), and the wiring 2 ensures the flow of data between the equipment 11 and the equipment 12.

Furthermore, in functional group FG2, the wiring 3 provides the electricity for the equipment 13 owing to the equipment 10, which in this example is a second electricity source, and the wiring 4 ensures the flow of data between the equipment 13 and the equipment 14.

Figure 2:
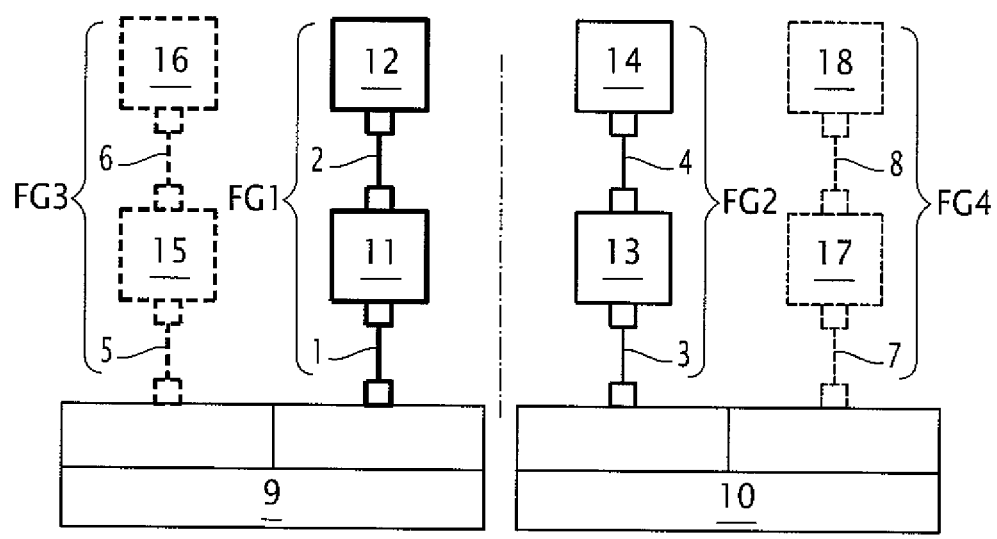
FIG. 2 is a diagrammatic illustration of an electrical wiring system done according to the inventive method for a system with an order 4 segregation or distribution.

In the example of FIG. 2, each electricity source 9 and 10 supplies a second equipment chain, each of these chains being associated with two other functional groups, compared with the example of FIG. 1.

Thus, in functional group FG3, the wiring 5 provides electricity for the equipment 15 owing to the electricity source 9, and the wiring 6 ensures the flow of data between the equipment 15 and the equipment 16.

Furthermore, in functional group FG4, the wiring 7 provides the electricity for the equipment 17 owing to the electricity source 10, and the wiring 8 ensures the flow of data between the equipment 17 and the equipment 18.

In other configurations, each wiring ensuring the electricity is also able to ensure the transmission of data other than electric power values between two pieces of equipment, and vice versa.

Each functional group FG1 to FG4 can be associated with a specific attribute value for the wirings, designed to facilitate the visual identification of the wiring segregations or distributions. Furthermore, each wiring of a given functional group can be assigned a predetermined color, different from the color of the wirings of the other functional groups.

In FIGS. 1 and 2, as in FIG. 3 which will be described later, to represent this attribute, the style of the line has been chosen: bold and solid for functional group FG1; non-bold and solid for functional group FG2; bold and dotted for functional group FG3; non-bold and dotted for functional group FG4.

Figure 3:
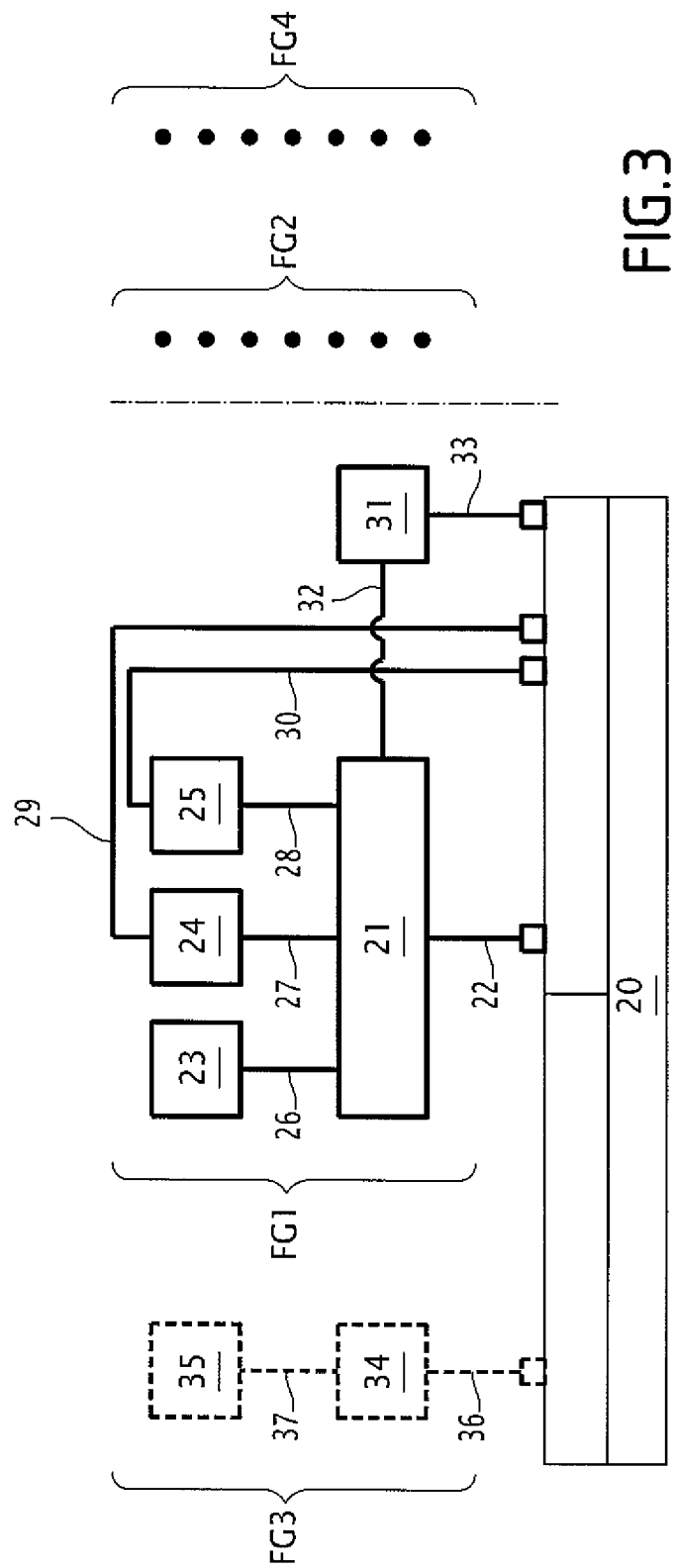
FIG. 3 is a diagrammatic illustration of an electrical wiring system done according to the inventive method for a system with an order 2 segregation or distribution and a backup system.

Consequently, the depiction of certain lines in bold and/or dotted lines in FIGS. 1, 2 and 3 has no meaning relative to the importance of the elements illustrated, or the fact that those elements can be hidden or optional, but is simply used to embody different attribute values.

Furthermore, each functional group FG1 to FG4 will be associated with a specific route, or a specific wiring path, in the aircraft, such that all of the wirings of a given functional group will pass through the corresponding wiring path.

Thus, the electrical wiring system shown in FIG. 1 comprises the wirings 1 to 4, which allow the power supply or the flow of data between the components or equipment 9 to 14 of the system.

These pieces of equipment 9 to 14 are grouped into subsystems, or equipment chains 9, 11, 12 and 10, 13, 14. These subsystems are each designed to perform a given function or to provide a predetermined level of redundancy.

In examples more complex than that shown in FIG. 1, the subsystems 9, 11, 12 and 10, 13, 14 could themselves be broken down, to a certain level, into subsystems each able to perform a given sub-function.

The allocation of the wirings 1 to 4 into the functional groups FG1 and FG2 is done such that all of the wirings allowing the flow of one or more data, including any data relative to the transmitted data electrical power, directly or indirectly necessary for the operation of the components or equipment of a given subsystem in order to perform the function or sub-function corresponding to it, are distributed in a single and same functional group.

Thus, the equipment 11 and 12 being defined as making up a first sub-system 11, 12 making it possible to perform a given function or sub-function, these pieces of equipment being powered by the electrical power supply source 9, the wirings 1 and 2 are associated with a first functional group FG1. Likewise, the pieces of equipment 13 and 14 being defined as making up a second sub-system 13, 14 making it possible either to perform the same function or sub-function or another given function or sub-function, those pieces of equipment being powered by the electric power source 10, the wirings 3 and 4 are associated with a second functional group FG2.

In the example of FIG. 2, aside from the elements already illustrated in FIG. 1, the system of electrical wirings also comprises the wirings 5 to 8 that allow the power supply or the flow of data between the components or pieces of equipment 9, 10 and 15 and 18 of the system.

Those pieces of equipment 9, 10 and 15 to 18 are grouped together in sub-systems, or chains of equipment 9, 15, 16 and 10, 17, 18. These subsystems are also each designed to perform a given function.

As for FIG. 1, in examples more complex than that shown in FIG. 2, the sub-systems 9, 15, 16 and 10, 17, 18 could themselves be broken down, to a certain level, into subsystems each able to perform a given sub-function.

The allocation of the wirings 5 to 8 in the functional groups FG3 and FG4 is also done such that all of the wirings allowing the flow of one or more data, including any data relative to the transmitted electrical power supply, directly or indirectly necessary for the operation of the components or pieces of equipment of a given subsystem for the performance of the corresponding function or sub-function, are distributed in a single and same functional group.

Thus, the pieces of equipment 15 and 16 being defined as making up a third subsystem 15, 16 making it possible to perform a given function or sub-function, those pieces of equipment being powered by the electrical power source 9, the wirings 5 and 6 are associated with a third functional group FG3. Likewise, the pieces of equipment 17 and 18 being defined as making up a fourth subsystem 17, 18 making it possible to perform either the same function or sub-function or another given function or sub-function, those pieces of equipment being powered by the electric power source 10, the wirings 7 and 8 are associated with a fourth functional group FG4.

Thus, the grouping of functions or sub-functions of systems of the aircraft into functional groups makes it possible to meet the objectives set out by the regulation in order to obtain certification for the system of electrical wirings.

In the case of a system of electrical wirings for an aircraft, the distribution of the wirings 1 to 8 in the different functional groups FG1 to FG4 can be obtained after analysis, for each function of the aircraft, of the redundancies necessary to meet the safety objectives. The segregation or distribution needs on the sub-functions are deduced from this analysis.

This allocation of the wirings 1 to 8 into the different available functional groups FG1 to FG4 may be consolidated through the use of a failure model at the global aircraft level.

It is thus possible to perform a verification of the system of electrical wirings. This verification for example consists of using a simplified model to verify the certification requirements.

It is also possible to verify that a simultaneous failure on at least two wirings of a same functional group does not cause an unwanted event for the system.

For these verifications, a model of the system will preferably be used associated with a failure tree representative of the sequence of events leading to an unwanted event for the system from one or more base events.

Based on the failure trees for each system, it is thus possible to verify that the allocation of the wirings into the functional groups that has been done complies with the certification criteria.

For all of the trees justifying unwanted events, for example of the catastrophic or dangerous type, for the aircraft, a "functional group" attribute is assigned in the tree, at all of the base events involving a breakdown or failure of the wiring. The use of such failure trees through post-processing thus makes it possible to verify that the certification criteria have been met.

If, during verification, it is possible to show the functional compatibility between two functional groups, i.e., that any simultaneous failure on those two functional groups does not lead to a catastrophic failure, that makes it possible to simplify the justification of the dense zones in which the wirings of two functional groups in question may not be able to meet the physical segregation criteria between functional groups.

The examples shown in FIGS. 1 and 2 show the allocation logic of the electrical wirings 1 to 8, related to the equipment 9 to 18, into functional groups FG1 to FG4, based on the number of redundancies of the system.

Thus, a level two redundancy corresponds to a level two segregation or distribution of the wirings 1 to 4 into functional groups FG1 and FG2, as shown in FIG. 1.

Likewise, a level four redundancy corresponds to a level four segregation or distribution of the wirings 1 to 8 in functional groups FG1 to FG4, as shown in FIG. 2.

More generally, when a redundancy of order n is considered, with n greater than or equal to two, the system being examined is considered to comprise n redundant subsystems, each able to perform the same given function or sub-function.

The wirings allowing the flow of one or more data, including data relative to the electric power supply power, directly or indirectly necessary for the operation of the components or equipment of one of the n redundant subsystems, in order to perform the corresponding function or sub-function, are then disturbed in a single and same functional group different from the functional groups in which the wirings are distributed allowing the flow of one or more data, including data relative to the electrical power supply power, directly or indirectly necessary for the operation of the components or pieces of equipment of the other n−1 redundant sub-systems.

Thus, an order two redundancy with two sub-systems 9, 11, 12 and 10, 13, 14 capable of carrying out the same sub-function translates to the distribution of the wirings 1, 2 on the one hand, and 3, 4 and the other hand, into functional groups FG1 and FG2, respectively.

Furthermore, an order four redundancy with the subsystem 9, 11, 12, the subsystem 10, 13, 14, the sub-system 9, 15, 16, and the sub-system 10, 17, 18, which are capable of performing the same sub-function, translates to the distribution of the wirings 1, 2, the wirings 3, 4, the wirings 5, 6, and the wirings 7, 8, into functional groups FG1, FG2, FG3 and FG4, respectively.

Thus, the entire functional chain necessary for the operation of a channel of the redundancy, in order to perform the corresponding function, is allocated to the same functional group. This makes it possible for one channel of the redundancy to be operational by itself, and does not depend on information from another functional group. In this way, in the event of a failure on another functional group, this redundancy channel is not affected.

The allocation of the wiring to a functional group is then preferably done in the first group FG1, for so-called left dependency wiring, and in the second group FG2, for a so-called right dependency wiring, for an order two redundancy. If it is necessary to provide a higher-order redundancy, functional groups FG3 and FG4 are used, in order to convey the wirings therein relative to the order 3 or 4 redundancy channels, which are independent from the first two.

The distribution of all of the wirings of the aircraft into functional groups is a primary (functional) segregation between signals. A specific secondary segregation even within functional groups may exist, in order to separate the signals, for example to avoid any electromagnetic disruption that could be caused, within a same functional group, by the excessive proximity of certain wirings to others based on the respective disruption and electromagnetic sensitivity levels of each of those wirings.

In order to still more precisely illustrate the method according to the invention, already presented above in two examples in reference to FIGS. 1 and 2, the fuel system (or sub-system) of an aircraft may be examined.

The system comprises two redundant equipment chains 9, 11, 12 and 10, 13, 14 associated with two primary computers.

The chain corresponding to the first primary computer 9, 11, 12 is assigned to functional group FG1, and the chain corresponding to the second primary computer 10, 13, 14 is assigned to functional group FG2, groups FG1 and FG2 being used by default for the order 2 segregations or distribution.

Such a configuration for example corresponds to the example shown in FIG. 1.

For each of these chains redundant with respect one another, all of the data necessary for their nominal operation (power, acquired discrete data, acquired analog data, acquired digital data, etc.) come from the same functional group. This requirement of belonging to the same functional group applies not only to all of the data interfacing with the fuel system, but also all of the data used to develop those interfacing data, up to the initial transmitter of the data used, for a multi-system integration purpose.

In addition to the two primary computers 9, 11, 12 and 10, 13, 14, a low tank level detection 9, 15, 16, independent of these two computers, exists. This sub-function is then assigned to functional group FG3, so as to be completely segregated from the two primary chains 9, 11, 12 and 10, 13, 14 corresponding to the two primary computers. This functional group FG3 is also used for all of the wirings on which data flow that are necessary for the nominal operation of that low tank level detection function or sub-function.

Such a configuration corresponds to the example of FIG. 2, with a sub-function performed by the chain 10, 17, 18 not outlined here, but assigned to functional group FG4.

Exceptions to this systematic rule for allocation into functional groups FG1 to FG4 may exist, for example for wirings on which input data flow that cannot comply with the requirements corresponding to the functional groups, due to the architectures of the other systems of the aircraft.

These exceptions are studied precisely on a case-by-case basis, in order to ensure that a failure on the wirings in question does not cause a catastrophic breakdown for the operation of the system.

Another example is illustrated in FIG. 3. In this example, a computer 21 is electrically powered by an electrical power supply source 20 by means of a wiring 22.

This computer is connected to three actuators 23, 24 and 25 by means of corresponding wirings 26, 27 and 28. In this example, only actuators 24 and 25 require an electrical power supply, and they are therefore connected to the power source 20 by the wirings 29 and 30, respectively.

This computer 21 is also connected to an information display device 31 by a wiring 32, that device 31 in turn being connected to the power source 20 by a wiring 33.

All of the equipment of the system makes it possible to perform a function of the aircraft (for example braking, deployment of the landing gear, replacement of a control surface, etc.).

The wirings 22, 29, 30 and 33 are electric power supply wirings, while the wirings 26 to 28 and 32 are data transmission wirings. All of these wirings constitute a first functional group FG1.

These pieces of equipment for example have an order two redundancy, i.e., there is a second set of equipment and wirings in the aircraft, identical to the first set of equipment and wirings grouped together in functional group FG1. The wirings of that second set constitute a second functional group that is only shown in FIG. 3 by reference to FG2.

As a supplement to these two sets, there is a third set of equipment and wirings, for example a so-called "backup" set for example formed by an emergency control button 34 and an actuator 35, the button 34 being connected to the power supply source 20 by a wiring 36 and to the actuator 35 by a wiring 37. The wirings 36 and 37 constitute a third functional group FG3.

As for FG1, these pieces of equipment of the so-called "backup" set may have a redundancy, for example of order two. In that case, there is a second so-called "backup" set of equipment and wirings, identical to the first set of equipment and wirings grouped together in functional group FG3. The wirings of this second "backup" set constitute a fourth functional group that is only shown in FIG. 3 by reference to FG4.

As for the examples of FIGS. 1 and 2, each wiring 22, 26 to 30, 32, 33, 36 and 37 of this example of FIG. 3 comprises one or more electric cables.

It is also possible to associate each electric functional group with elements that are part of functional groups of a different nature from the electric functional groups, for example elements making up a hydraulic or pneumatic functional group associated with the corresponding electric functional group to perform a given function.

This allocation has the advantage of being able, for example, to arrange the hoses and wirings consistently (by allowing the routing of the wirings and hoses of a same functional group in a close manner, and the wirings and hoses of different functional groups with a fixed segregation criterion).

For the step for verifying the allocation of the functional groups by the failure trees, the breakdowns affecting the hoses are taken into account in the failure trees in the same way as breakdowns affecting the wirings; the verification of the certification criteria on the breakdowns of functional groups can therefore include the verification of elements other than the wirings, in particular such as the hoses.

It is thus possible to provide a global design method for the aircraft that unites the different elements of the aircraft into associated functional groups (for example electric, pneumatic, hydraulic), the elements of those groups (wirings, pipes, hoses) following a same pathway within the aircraft and being identified using the same visual references or attribute values.

The present description has been provided as a non-limiting example of the invention. In particular, the invention is not limited to the system of electrical wirings for an aircraft.

The invention thus also applies to any complex system that may require redundancy needs other than those provided by the aeronautic regulations (for example, in the automobile, rail or naval fields), in particular to meet safety criteria, but also for example availability criteria for the redundant functions.

Furthermore, in the case of an aircraft, favoring functional groups by default, such as FG1 and FG2, relative to other functional groups FG3, FG4, leads to two first functional groups FG1 and FG2 that include many more wirings than the other functional groups. This allocation logic is only one example dictated by the specific development constraints on a specific aircraft. Other constraints, for other aircraft having different development possibilities, may lead to a different allocation logic, which ultimately makes it possible to demonstrate that the safety criteria imposed by the regulations have been met.

What is claimed is:

1. A method for designing a system of electrical wirings for a complex system, each electrical wiring comprising one or more electric cables designed to allow the flow of digital, analog or discrete data between components of the complex system and/or the transmission of electricity to components of the complex system, the components of the complex system being grouped together in subsystems each able to perform a predetermined function, each subsystem in turn being able to be broken down, to a predetermined level, into subsystems each capable of performing a predetermined sub-function, the method comprising:

distributing the wirings into functional groups, such that all of the wirings allowing the flow of one or more data and/or the transmission of electricity, directly or indirectly for the operation of the components of a subsystem for performing the function or sub-function corresponding to that subsystem, are distributed in a single and same functional group;

determining compatibility between two functional groups that in particular consists of determining whether any simultaneous failure on at least one wiring of one of the two functional groups and on at least one wiring of the other of the two functional groups leads to an unwanted event in the system; and manufacturing a system of electrical wirings, the wirings being distributed according to the step of distributing.

2. The method as recited in claim 1 wherein the complex system includes at least n redundant subsystems, with n greater than or equal to 2, each able to perform a same predetermined function or sub-function, wherein the wirings allowing the flow of one or more data, and/or the transmission of electricity, directly or indirectly for the operation of the components of one of the n redundant subsystems, in order to perform the corresponding function or sub-function, are distributed in a single and same functional group different from the functional groups in which the wirings are distributed allowing the flow of one or more data, and/or the transmission of electricity, directly or indirectly for the operation of the components of the other n−1 redundant subsystems.

3. The method as recited in claim 2 wherein each functional group is associated with a distinct wiring path within the complex system such that the wirings of a predetermined functional group pass through a wiring path distinct from the wiring paths of the other functional groups.

4. The method as recited in claim 1 wherein each functional group is associated with a distinct wiring path within the complex system such that the wirings of a predetermined functional group pass through a wiring path distinct from the wiring paths of the other functional groups.

5. The method as recited in claim 1 wherein each functional group is associated with a wiring path in the complex system, two compatible functional groups being associated with a same wiring path, two incompatible functional groups being associated with two distinct wiring paths, such that the wirings of two compatible functional groups pass through a same wiring path and the wirings of two incompatible functional groups pass through two distinct wiring paths.

6. The method as recited in claim 1 wherein all of the wirings have an associated attribute, the value of the attribute of the wirings of a same functional group being distinct from the respective values of the attribute of the wirings of the other functional groups.

7. The method as recited in claim 6 wherein the associated attribute is color.

8. The method as recited in claim 1 further comprising verifying a failure caused by a breakdown of each of the wirings within the functional groups does not lead to an unwanted event in the system.

9. The method as recited in claim 8 wherein the verifying includes verifying that a simultaneous failure on at least two wirings of a same functional group does not lead to an unwanted event in the system.

10. The method as recited in claim 9 wherein the verifying includes using a failure tree representative of a sequence of events leading to an unwanted event in the system from one or more base events.

11. The method as recited in claim 8 wherein the verifying includes using a failure tree representative of a sequence of events leading to an unwanted event in the system from one or more base events.

12. The method as recited in claim 1 wherein at least one of the functional groups is associated with a nonelectric functional group grouping together connecting elements between components of the complex system, the nature of the connection not being electric.

13. The method as recited in claim 12 wherein the connection is hydraulic or pneumatic.

14. The method as recited in claim 12 wherein the functional group associated with the nonelectric functional group, and the nonelectric functional group are associated with a same physical path within the complex system.

15. The method as recited in claim 14 wherein all of the wirings of the functional group associated with the nonelectric functional group are associated with an attribute, all of the connecting elements of the nonelectric functional group are associated with the attribute, and the value of the attribute of the wirings of the functional group associated with the nonelectric functional group is identical to the value of the attribute of the connecting elements of the nonelectric functional group.

16. The method as recited in claim 14 further comprising verifying that a failure caused by a breakdown of each of the connecting elements of an electric functional group does not lead to an unwanted event in the system.

17. The method as recited in claim 12 wherein all of the wirings of the functional group associated with the nonelectric functional group are associated with an attribute, all of the connecting elements of the nonelectric functional group are associated with the attribute, and the value of the attribute of the wirings of the functional group associated with the nonelectric functional group is identical to the value of the attribute of the connecting elements of the nonelectric functional group.

18. The method as recited in claim 17 further comprising verifying that a failure caused by a breakdown of each of the connecting elements of an electric functional group does not lead to an unwanted event in the system.

19. The method as recited in claim 1 wherein the complex system is an aircraft or part of an aircraft.

20. A complex system comprising:

an electrical wiring system including electrical wirings, each electrical wiring including one or more electric cables designed to allow the flow of digital, analog or discrete data between components of the complex system and/or the transmission of electrical power to components of the complex system, the components of the complex system being grouped together in subsystems each able to perform a predetermined function, each subsystem in turn being able to be broken down, to a predetermined level, into subsystems each able to perform a predetermined sub-function, the wirings being distributed into functional groups, such that all of the wirings allowing the flow of one or more data and/or the transmission of electricity, directly or indirectly for the operation of the components of a subsystem for performing the function or sub-function corresponding to that subsystem, are distributed in a single and same functional group, in such a way that any simultaneous failure on at least one wiring of one of the functional groups and on at least one wiring of another of the functional groups does not lead to an unwanted event in the system.

21. The complex system as recited in claim 20 comprising connecting elements between components, the nature of the connection not being electric,
   at least one of the functional groups being associated with a nonelectric functional group grouping together said connecting elements.

22. The complex system as recited in claim 21 wherein the connection is hydraulic or pneumatic.

23. The complex system as recited in claim 21 wherein the functional group associated with the nonelectric functional group, and the nonelectric functional group are associated with a same physical path within the complex system.

24. The complex system as recited in claim 20 being an aircraft or part of an aircraft.

25. A method for designing a system of electrical wirings for a complex system, each electrical wiring comprising one or more electric cables designed to allow the flow of digital, analog or discrete data between components of the complex system and/or the transmission of electricity to components of the complex system, the components of the complex system being grouped together in subsystems each able to perform a predetermined function, each subsystem in turn being able to be broken down, to a predetermined level, into subsystems each capable of performing a predetermined sub-function, the method comprising:
   distributing the wirings into functional groups, such that all of the wirings allowing the flow of one or more data and/or the transmission of electricity, directly or indirectly for the operation of the components of a subsystem for performing the function or sub-function corresponding to that subsystem, are distributed in a single and same functional group;
   verifying a failure caused by a breakdown of each of the wirings within the functional groups does not lead to an unwanted event in the system, the verifying including verifying that a simultaneous failure on at least two wirings of a same functional group does not lead to an unwanted event in the system; and
   manufacturing a system of electrical wirings, the wirings being distributed according to the step of distributing.

* * * * *